INVENTORS
KAZUAKI GOSHIMA
KANJI TOKUYAMA

BY, *Wenderoth, Lind & Ponack*

ATTORNEYS

INVENTORS
KAZUAKI GOSHIMA
KANJI TOKUYAMA

United States Patent Office
3,451,993
Patented June 24, 1969

1

3,451,993
PROCESS FOR PREPARING DIACETONE-L-SORBOSE
Kazuaki Goshima and Kanji Tokuyama, Osaka-shi, Japan, assignors to Shionogi & Co., Ltd., Osaka, Japan
Filed Apr. 25, 1967, Ser. No. 633,566
Claims priority, application Japan, Apr. 25, 1966, 41/26,529, 41/26,530
Int. Cl. C08b 19/00; C07g 3/00; C07d 21/00
U.S. Cl. 260—210   5 Claims

ABSTRACT OF THE DISCLOSURE

L-sorbose is reacted with acetone dialkyl ketal in acetone medium in the presence of sulfuric acid at 0° to 30° C. for 10 to 100 minutes to yield diacetone-L-sorbose economically and industrially, and the said reaction is effected similarly by using alkanol in lieu of acetone dialkyl ketal.

Figure 3:
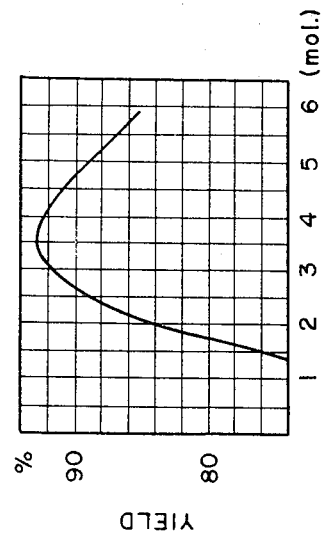

The present invention relates to a process for preparing diacetone-L-sorbose. More particularly, it relates to an improvement in the production of diacetone-L-sorbose which is a very important intermediate for the production of L-ascorbic acid. More specifically, it is concerned with the use of acetone dialkyl ketal or alkanol for the economical and industrial production of diacetone-L-sorbose.

Diacetone-L-sorbose has been heretofore prepared by several methods. For instance, Reichstein prepares diacetone-L-sorbose with acetone in the presence of sulfuric acid for 24 hours [Japanese Pat. No. 115,030], Maksimov prepares it in 92% of yield by reacting them in the presence of sulfuric acid and cupric sulfate for 45 hours [Chemical Abstracts, vol. 34, p. 380 (1940)], Ogawa prepares it in 80 to 90% of yield by reacting them in the presence of sulfuric acid and anhydrous alum for 20 hours [Japanese Pat. No. 173,874], and Ishihara prepares it in 70% of yield by reacting them in the presence of potassium pyrosulfate for 20 to 25 hours [Japanese Pat. No. 187,089]. However, the said known methods require more than 20 hours for the reaction and so these methods are unsuitable for industrial production of diacetone-L-sorbose. Still, there have been known a few methods whereby the production of diacetone-L-sorbose is carried out in a shorter time. Namely, Uda prepares diacetone-L-sorbose in 69% of yield by reacting L-sorbose with acetone diethyl ketal in the presence of hydrochloric acid without acetone while heating for an hour [Japanese Pat. No. 166,802] and Hosokawa prepares it in 76% of yield by reacting L-sorbose with acetone in the presence of sulfuric acid and zinc chloride by use of supersonic waves [Japanese Pat No. 211,708]. Although Uda's method and Hosokawa's method make conspicuous progress in the reaction time, these methods are not superior in the yield to classical Reichstein's method. Further, Hosokawa's method has another defect on the operation such as employment of supersonic wave-generating equipment. In spite of these various efforts paid for improvement of the known methods, three problems (i.e. reaction rate, operation and yield) have not been solved yet at the same time.

One of the present inventors, Tokuyama and others found previously that L-sorbose is first reacted with acetone to give monoacetone-L-sorbopyranose and that two mol of monoacetone-L-sorbopyranose gives one mol of diacetone-L-sorbose [Tokuyama et al.: J. Org. Chem., vol. 29, p. 133 to 136 (1964)]. Namely, the reagent to acetonate the monoacetone-L-sorbopyranose into diacetone-L-sorbose is not acetone but monoacetone-L-sorbopyranose. This process is shown by the following formulae:

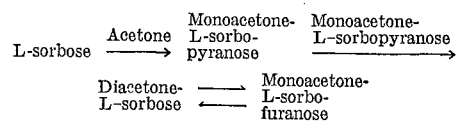

Then, the present inventors have presumed that it is more profitable to employ acetone dialkyl ketal for the diacetonation of L-sorbose than to employ half the amount of monoacetone-L-sorbopyranose as an acetonating agent. Basing on the above presumption, the following test experiment is carried out:

TEST EXPERIMENT

L-sorbose is reacted with acetone diethyl ketal in the presence of p-toluenesulfonic acid for 4 hours at room temperature and the resultant products are examined concisely. There are produced considerable amounts of some side products (e.g. monoacetone-L-sorboses, isomers of diacetone-L-sorbose, triacetone-L-sorbose) as well as diacetone-L-sorbose.

In view of very rapid reaction rate in the reaction of L-sorbose with acetone diethyl ketal, it seems to be required to control the reaction conditions and reaction rate suitably for checking the production of the said side products and increasing the yield. Although Uda's method involves employing acetone diethyl ketal for diacetonation of L-sorbose, insufficiency of the yield in his method seems to be ascribed to overprocess of the reaction owing to excessive reaction conditions such as heating. However, the above defects of the known methods have been now overcome by the process of the present invention.

Accordingly, it is an object of the present invention to provide a commercial and industrial process for producing diacetone-L-sorbose in a short time with simple operations in a high yield. It is another object of the present invention to provide a diacetonation process of L-sorbose utilizing acetone dialkyl ketal as an acetonating agent. It is a further object of the present invention to provide a process for preparing diacetone-L-sorbose by employing alkanol in lieu of acetone dialkyl ketal in a similar manner as aforementioned.

These and other objects, and attendant advantages of the present invention, will be apparent to those who are conversant with the art to which this invention pertains, from the following disclosure and the appended claims.

The process of the present invention comprises reacting L-sorbose with acetone dialkyl ketal in acetone medium in the presence of sulfuric acid at 0° to 30° C. for 10 to 100 minutes or mixing L-sorbose with alkanol, acetone and sulfuric acid at 0° to 30° C. for 10 to 100 minutes wherein alkanol is first reacted with acetone and then the resultant acetone dialkyl ketal is reacted with L-sorbose to give diacetone-L-sorbose.

The present process is represented by the following formulae:

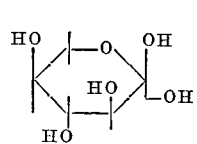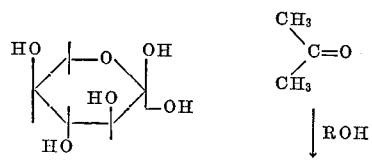

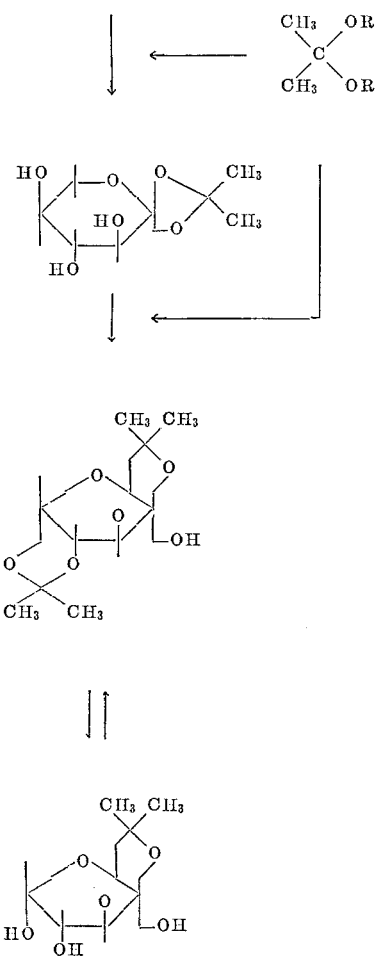

wherein R represents a lower alkyl group.

As the acetone dialkyl ketal, there are exemplified acetone dimethyl ketal, acetone diethyl ketal, acetone di-n-propyl ketal, acetone diisopropyl ketal, acetone di-n-butyl ketal and acetone diisobutyl ketal. As the alkanol, there are exemplified methanol, ethanol, propanol, isopropanol, n-butanol and isobutanol.

Preferable amounts of the materials used in the present process are shown as follows:

(a) When the reaction is effected by using acetone dialkyl ketal, preferable amounts of the materials used are shown in the following table, as results of many tests adopting the same conditions as in Example 1, varying the amount of the material and examining the yield of diacetone-L-sorbose.

Figure 1:
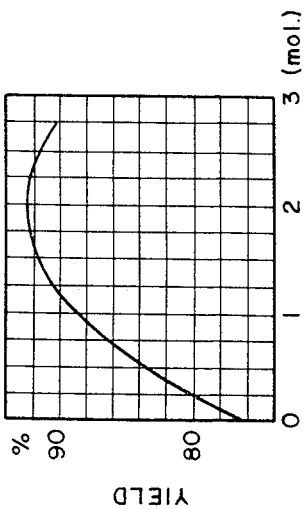
Figure 2:
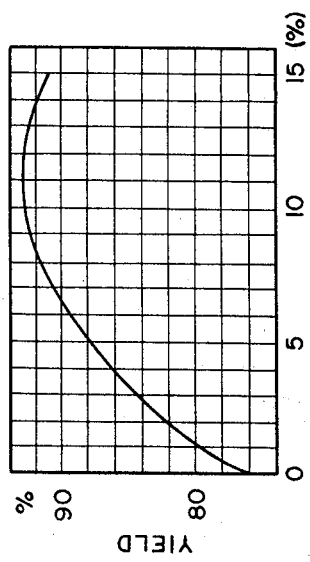

| Material | Preferable amount | Note |
| --- | --- | --- |
| Acetone dialkyl ketal to L-sorbose | 1.5–2.5 mol equiv | Fig. 1. |
| Acetone dialkyl ketal to acetone | 8–15% | Fig. 2. |
| Sulfuric acid to L-sorbose | 2.7–4.5 mol equiv | Fig. 3. |

NOTE.—Figure 1 shows the relation between the amount of acetone dimethyl ketal used (unit: numbers of mol equivalent to L-sorbose) and the yield of diacetone-L-sorbose (unit: percent) in the tests effected by the same conditions as in Example 1. Figure 2 shows the relation between the amount of acetone-dimethyl ketal (unit: percent to amount of acetone) and the yield of diacetone-L-sorbose (unit: percent) in the tests effected by the same conditions as in Example 1. Figure 3 shows the relation between the amount of sulfuric acid used (unit: numbers of mol equivalent to L-sorbose) and the yield of diacetone-L-sorbose (unit: percent) in the tests effected by the same conditions as in Example 1.

(b) When the reaction is effected by using alkanol, preferable amounts of the materials used are shown in the following table, as results of many tests adopting the same conditions as in Example 2, varying the amounts of the material and examining the yield of diacetone-L-sorbose.

Figure 4:
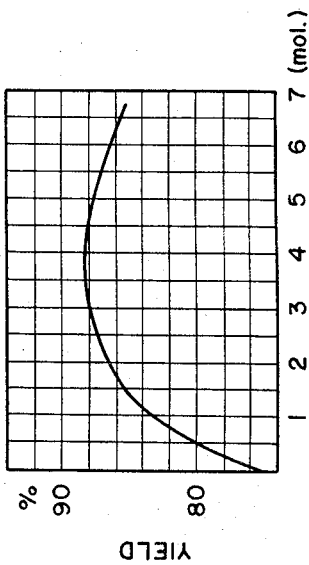
Figure 5:
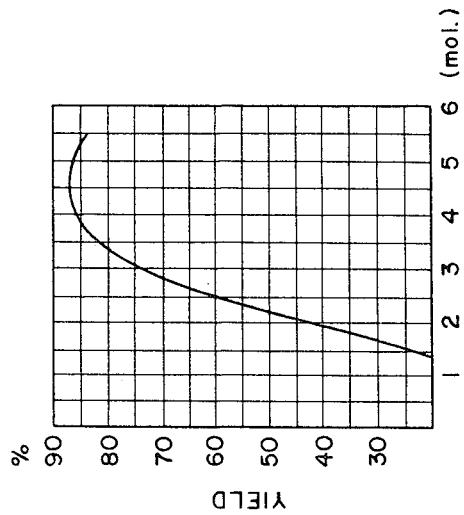

| Material | Preferable amount | Note |
| --- | --- | --- |
| Alkanol to L-sorbose | 3.0–5.0 mol equiv | Fig. 4. |
| Sulfuric acid to L-sorbose | 3.0–5.5 mol equiv | Fig. 5. |

NOTE.—Figure 4 shows the relation between the amount of alkanol used (unit: numbers of mol equivalent to L-sorbose) and the yield of diacetone-L-sorbose (unit: percent) in the tests effected by the same conditions as in Example 2. Figure 5 shows the relation between the amount of sulfuric acid (unit: numbers of mol equivalent to L-sorbose) and the yield of diacetone-L-sorbose (unit: percent) in the tests effected by the same conditions as in Example 2.

As the reaction conditions, the reaction time may be adopted within the scope of the time from 10 minutes to 100 minutes, and the reaction temperature may be adopted within the scope of the temperature from 0° C. to 30° C. Since there are observed some correlations between the reaction time and the reaction temperature, it is necessary for decision of the reaction conditions to consider these correlations. Thus, the reaction may be preferably effected longer while the reaction temperature is lower, and the reaction may be preferably effected shorter while the reaction temperature is higher. As the conditions affording preferable results in the yield, there are exemplified 10 to 18 minutes at 30° C., 15 to 40 minutes at 20° C., 50 to 80 minutes at 10° C. and 60 to 100 minutes of 5° C. in the reaction of using acetone dialkyl ketal, as shown in FIGURE 6, and there are exemplified 12 to 18 minutes at 30° C., 25 to 50 minutes at 20° C., 50 to 80 minutes at 10° C. and 60 to 90 minutes at 5° C. in the reaction of using alkanol, as shown in FIGURE 7.

Figure 6:
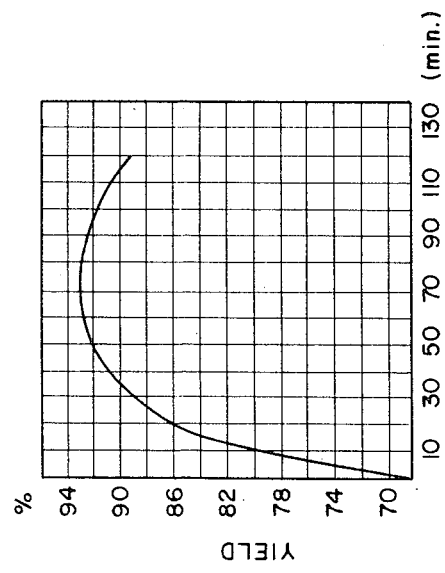
Figure 7:
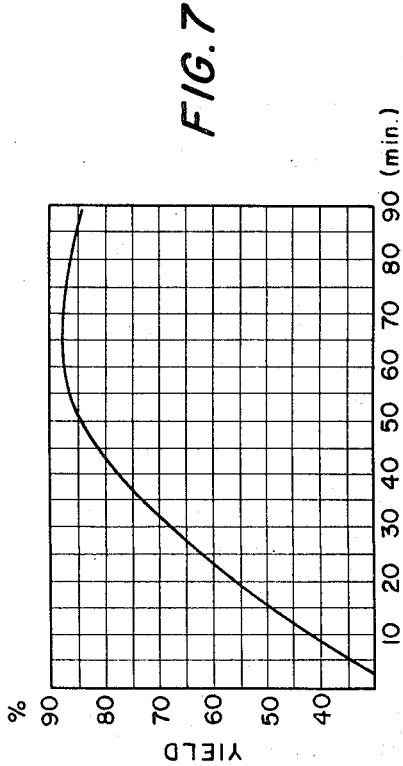

(NOTE.—FIGURE 6 shows the relation between the reaction time (unit: minute) and the yield of diacetone-L-sorbose (unit: percent) in the tests effected by the same conditions as in Example 1, varying the reaction time and examining the yield. FIGURE 7 shows the relation between the reaction time (unit: minute) and the yield of diacetone-L-sorbose (unit: percent) in the tests effected by the same conditions as in Example 2, varying the reaction time and examining the yield.)

The treatments and procedures after the reaction may be carried out in a conventional manner. For instance, it is necessary for control of heat generation from neutralization and also for finishing the movement of equilibrium from monoacetone-L-sorbofuranose to diacetone-L-sorbose to cool the reaction mixture sufficiently such as at −30° to −10° C. by use of a cryogen or a cooling device. Ordinary treatments may be effected by cooling the reaction mixture, neutralizing it with aqueous sodium hydroxide, separating the acetone layer, evaporating the acetone, extracting the residue with benzene and distillating the product or collecting the product without distillation.

The process of the present invention has the following profitable points as an economical and industrial process for preparing diacetone-L-sorbose.

(1) Since this reaction can proceed rapidly, for instance, it is finished in 60 minutes in Example 1, the present process is an excellent process in shortness of the reaction time in comparison with known methods.

(2) The present process can be carried out with simplicity of the reaction operations and this reaction is suitable for the industrial mass production.

(3) The present process is excellent in the yield of diacetone-L-sorbose. Excellences of this process are shown in the following table, comparing this process in reaction time, procedure, yield and adjuvants with known methods.

| Method | Adjuvant | Procedure | Time | Yield |
|---|---|---|---|---|
| Reichstein | $H_2SO_4$ | Room temp. | 24 hrs | 63–83 |
| Maksimov | $H_2SO_4$, $CuSO_4$ | do | 45 hrs | 92 |
| Ogawa | $H_2SO_4$, anhydrous alum. | Below 15° C | 20 hrs | 80–90 |
| Ishihara | $K_2S_2O_7$ | 10–35° C | 20–25 hrs | 70 |
| Uda [1] | HCl | Heating on water bath. | 1 hr | 69 |
| Hosokawa | $H_2SO_4$, $ZnCl_2$ | 20° C. supersonic waves. | 40 min | 76 |
| Subjective Process [2] | $H_2SO_4$ | 10° C | 60 min | 92.6 |
| Do [3] | $H_2SO_4$ | 10° C | 60 min | 88.0 |

[1] Acetone is not used but acetone diethyl ketal is used.
[2] Acetone dimethyl ketal and acetone are used (Example 1 referred to).
[3] Methanol and acetone are used (Example 2 referred to).

Accordingly, some of the known methods are not inferior to the subjective processes independently in the above three conditions (i.e., reaction rate, procedure, yield), but none of them is superior to the subjective processes at the same time in the said three conditions.

For showing clearly the excellent effects of the present process, the following comparative experiment is carried out. Since this process comprises using acetone dialkyl ketal or alkanol, control experiment is carried out by effecting the same reaction as in the present process (i.e., Example 1 and Example 2) except employment of acetone dialkyl ketal or alkanol.

CONTROL EXPERIMENT

To a suspension of L-sorbose (16.9 parts by weight) in acetone (192 parts by volume), there is added 98% sulfuric acid (32.4 parts by weight) with stirring and cooling, and the resultant mixture is stirred at 10° C. for an hour. After cooling, the resultant mixture is neutralized with 9% aqueous sodium hydroxide (283 parts by weight), and the acetone layer is separated and evaporated. The residue is extracted with benzene and the benzene layer is washed with water, dried over anhydrous sodium sulfate and the benzene is evaporated to give diacetone-L-sorbose (18.4 parts by weight). Yield is 75.6%.

Thus, yield of diacetone-L-sorbose in the reaction without employment of acetone dialkyl ketal or alkanol is 75.6%, but the yield in the reaction of using acetone such as acetone dimethyl ketal (Example 1 referred to) is 92.6% and the yield of using alkanol such as methanol (Example 2 referred to) is 88.0%. Namely, increment of the yield by use of acetone dialkyl ketal in the said case is 17.0% and that of alkanol in the above case is 12.4%.

Presently-preferred and practical embodiments of the present invention are illustratively shown by the following examples. The relationship of parts by weight to parts by volume is the same as that between grams and milliliters. Temperatures are set forth in degree centigrade.

EXAMPLE 1

To a suspension of L-sorbose (16.9 parts by weight) in acetone (192 parts by volume), there are added 98% sulfuric acid (32.4 parts by weight) by acetone dimethyl ketal (23 parts by volume) with stirring and cooling, and the resultant mixture is stirred at 10° C. for an hour. The reaction mixture is cooled at −20° C. with the cryogen of Dry Ice and acetone and neutralized with 9% aqueous sodium hydroxide (283 parts by weight). The acetone layer is separated and evaporated and the residue is extracted with benzene. The benzene layer is washed with water, dried over anhydrous sodium sulfate and the benzene is evaporated to give diacetone-L-sorbose (22.6 parts by weight) as crystals melting at 77 to 79° C. Yield is 92.6%.

EXAMPLE 2

To a suspension of L-sorbose (16.9 parts by weight) in acetone (192 parts by volume), there are added 98% sulfuric acid (41.4 parts by weight) and methanol (15 parts by volume) with stirring and cooling, and the resultant mixture is stirred at 10° C. for 60 minutes. The reaction mixture is cooled at −20° C. with the cryogen of Dry Ice and acetone and neutralized with 9% aqueous sodium hydroxide (401 parts by weight). The acetone layer is separated and evaporated and the residue is extracted with benzene. The benzene layer is washed with water, dried over anhydrous sodium sulfate and the benzene is evaporated to give diacetone-L-sorbose (21.5 parts by weight) as crystals melting at 77 to 78° C. Yield is 88.0%.

EXAMPLE 3

To a suspension of L-sorbose (16.9 parts by weight) in acetone (192 parts by volume), there are added 98% sulfuric acid (32.2 parts by weight) and acetone diethyl ketal (31.4 parts by volume) with stirring and cooling, and the resultant mixture is stirred at 10° C. for an hour. The reaction mixture is cooled at −20° C. with the cryogen of Dry Ice and acetone, neutralized with 9% aqueous sodium hydroxide (283 parts by weight). The acetone layer is separated and evaporated and the residue is extracted with benzene. The benzene layer is washed with water, dried over anhydrous sodium sulfate and the benzene is evaporated to give diacetone-L-sorbose (21.3 parts by weight) as crystals melting at 77 to 78° C. Yield is 87.2%.

EXAMPLE 4

To a suspension of L-sorbose (16.9 parts by weight) in acetone (192 parts by volume), there are added 98% sulfuric acid (50 parts by weight) and ethanol (45 parts by volume) with stirring and cooling, and the resultant mixture is stirred at 10° C. for 60 minutes. The reaction mixture is cooled at −20° C. with the cryogen of Dry Ice and acetone and neutralized with 9% aqueous sodium hydroxide (453 parts by weight). The acetone layer is separated and evaporated and the residue is extracted with benzene. The benzene layer is washed with water, dried over anhydrous sodium sulfate to give diacetone-L-sorbose (21.0 parts by weight). Yield is 86.0%.

EXAMPLE 5

To a suspension of L-sorbose (16.9 parts by weight) in acetone (192 parts by volume), there are added 98% sulfuric acid (32.4 parts by weight) and acetone dimethyl ketal (23 parts by volume) with stirring and cooling, and the resultant mixture is stirred at 5° C. for 80 minutes. The reaction mixture is treated similarly to Example 1 to give diacetone-L-sorbose (22.9 parts by weight). Yield is 93.8%.

EXAMPLE 6

To a suspension of L-sorbose (16.9 parts by weight) in acetone (192 parts by volume), there are added 98% sulfuric acid (32.4 parts by weight) and methanol (15 parts by volume) with stirring and cooling, and the resultant mixture is stirred at 5° C. for 80 minutes. The reaction mixture is treated similarly to Example 2 to give diacetone-L-sorbose (21.7 parts by weight). Yield is 88.9%.

EXAMPLE 7

To a suspension of L-sorbose (16.9 parts by weight) in acetone (192 parts by volume), there are added 98% sulfuric acid (32.4 parts by weight) and acetone dimethyl ketal (23 parts by volume) with stirring and cooling, and the resultant mixture is stirred at 30° C. for 15 minutes. The reaction mixture is treated similarly to Example 1 to give diacetone-L-sorbose (21.0 parts by weight). Yield is 86.1%.

EXAMPLE 8

To a suspension of L-sorbose (16.9 parts by weight) in acetone (192 parts by volume), there are added 98% sulfuric acid (32.4 parts by weight) and methanol (15 parts by volume) with stirring and cooling, and the resultant mixture is stirred at 30° C. for 15 minutes. The reaction mixture is treated similarly to Example 2 to give diacetone-L-sorbose (19.9 parts by weight). Yield is 81.4%.

EXAMPLE 9

To a suspension of L-sorbose (16.9 parts by weight) in acetone (192 parts by volume), there are added 98% sulfuric acid (32.4 parts by weight) and acetone dimethyl ketal (23 parts by volume), and the resultant mixture is treated similarly to Example 1 to give diacetone-L-sorbose (22.1 parts by weight). Yield is 90.6%.

EXAMPLE 10

To a suspension of L-sorbose (16.9 parts by weight) in acetone (192 parts by volume), there are added 98% sulfuric acid (32.4 parts by weight) and methanol (15 parts by volume) with stirring and cooling, and the resultant mixture is treated similarly to Example 2 to give diacetone-L-sorbose (20.9 parts by weight). Yield is 85.8%.

What is claimed is:
1. A process for preparing diacetone-L-sorbose which comprises mixing L-sorbose, acetone, sulfuric acid with a member selected from the group consisting of acetone dialkyl ketal and alkanol and reacting them at 0° to 30° C. for 10 to 100 minutes.
2. A process in accordance with claim 1 wherein acetone dialkyl ketal is acetone dimethyl ketal and alkanol is methanol.
3. A process in accordance with claim 1 wherein acetone dialkyl ketal is acetone diethyl ketal and alkanol is ethanol.
4. A process for preparing diacetone-L-sorbose which comprises reacting L-sorbose with 1.5 to 2.5 mol equivalent of acetone diakyl ketal in acetone medium in the presence of 2.7 to 4.5 mol equivalent of sulfuric acid at 0° to 30° C. for 10 to 100 minutes.
5. A process for preparing diacetone-L-sorbose which comprises mixing L-sorbose with 3.0 to 5.0 mol equivalent of alkanol in acetone medium in the presence of 3.0 to 5.5 mol equivalent of sulfuric acid and reacting them at 0° to 30° C. for 10 to 100 minutes.

References Cited

Tomuyama et al.: Bull. Chem. Soc. Japan, vol. 37, No. 4, 1964, pp. 591–2.

ALEX MAZEL, *Primary Examiner.*

JAMES H. TURNIPSEED, *Assistant Examiner.*

U.S. Cl. X.R.

260—340.7, 340.9